United States Patent
Wang et al.

(10) Patent No.: US 9,961,128 B2
(45) Date of Patent: *May 1, 2018

(54) METHOD AND APPARATUS FOR BINDING TERMINALS

(71) Applicant: Tencent Technology (Shenzhen) Company Limited, Shenzhen (CN)

(72) Inventors: Qian Wang, Shenzhen (CN); Bo Qiu, Shenzhen (CN); Wei Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/496,378

(22) Filed: Apr. 25, 2017

(65) Prior Publication Data

US 2017/0230445 A1    Aug. 10, 2017

Related U.S. Application Data

(63) Continuation of application No. 14/491,649, filed on Sep. 19, 2014, now Pat. No. 9,667,532, which is a
(Continued)

(30) Foreign Application Priority Data

May 15, 2013 (CN) .......................... 2013 1 0179877

(51) Int. Cl.
*H04L 29/08* (2006.01)
(52) U.S. Cl.
CPC .............. *H04L 67/06* (2013.01); *H04L 67/10* (2013.01); *H04L 67/18* (2013.01)

(58) Field of Classification Search
CPC ......... H04L 45/30; H04L 67/06; H04L 67/18; H04L 67/10
See application file for complete search history.

(56) References Cited

U.S. PATENT DOCUMENTS 9,406,043 B1 * 8/2016 Amacker ............... G06Q 10/10
2008/0086537 A1   4/2008 Vaughan et al.
(Continued)

FOREIGN PATENT DOCUMENTS

CN    101860550 A    10/2010
CN    102195706 A    9/2011
(Continued)

OTHER PUBLICATIONS

International Search Report and Written Opinion dated Aug. 13, 2014 for International Application No. PCT/CN2014/075909, 9 pages.
Office Action dated Nov. 1, 2017 for Chinese Application No. 201310179877.7, 9 pages.

*Primary Examiner* — Brian D Nguyen
(74) *Attorney, Agent, or Firm* — Brinks Gilson & Lione

(57) ABSTRACT

A method and apparatus for binding terminals are disclosed in the field of communication technologies. In the method: a server receives first information including at least one of first geographical location information, first time information and first address information of the first terminal. The server receives second information including at least one of second geographical location information, second time information, and second address information of the second terminal. The server binds the first terminal and the second terminal according to the first information and the second information.

20 Claims, 8 Drawing Sheets

Related U.S. Application Data continuation of application No. PCT/CN2014/075909, filed on Apr. 22, 2014.

(56) References Cited

U.S. PATENT DOCUMENTS

| | | | |
|---|---|---|---|
| 2009/0172547 A1 | 7/2009 | Sparr | |
| 2010/0056183 A1 | 3/2010 | Oh | |
| 2010/0246484 A1* | 9/2010 | Hirano | H04W 8/065 370/328 |
| 2010/0321405 A1* | 12/2010 | MacInnes | G06T 3/00 345/635 |
| 2011/0231783 A1 | 9/2011 | Nomura | |
| 2012/0324002 A1 | 12/2012 | Chen | |
| 2013/0218820 A1 | 8/2013 | Li et al. | |
| 2014/0022397 A1* | 1/2014 | Huang | H04N 5/225 348/207.1 |
| 2015/0010004 A1* | 1/2015 | Wang | H04L 45/30 370/392 |

FOREIGN PATENT DOCUMENTS

| | | |
|---|---|---|
| CN | 102546835 A | 7/2012 |
| CN | 102547556 A | 7/2012 |
| CN | 102869073 A | 1/2013 |
| CN | 102932048 A | 2/2013 |
| WO | WO 02-079969 A2 | 10/2002 |

* cited by examiner

METHOD AND APPARATUS FOR BINDING TERMINALS

CROSS-REFERENCE TO RELATED APPLICATIONS

This application is a continuation of U.S. application Ser. No. 14/491,649 filed on Sep. 19, 2014, now U.S. Pat. No. 9,667,532, which is a continuation of International Application No. PCT/CN2014/075909, filed on Apr. 22, 2014, which claims priority to Chinese Patent Application No. 201310179877.7, filed on May 15, 2013, all of which are hereby incorporated herein by reference in their entireties.

TECHNICAL FIELD

The present disclosure relates generally to the field of communication technologies and, more particularly, to a method and apparatus for binding terminals.

BACKGROUND

Along with the development of communication technology, a terminal may be bound with another and easy, safe and rapid non-contact type point-to-point data transmission may be achieved between the terminals, thus providing great convenience to daily life.

A terminal may be a mobile terminal, a personal computer (PC) terminal. In a conventional method for binding terminals, a computer generates a two-dimensional code according to its own identification information to indicate the identification information. The mobile terminal scans the two-dimensional code, acquires the identification information of the PC terminal, and transmits the identification information of the mobile terminal and the acquired identification information of the PC terminal to a server. The server creates a binding relationship between the mobile terminal and the PC terminal according to the identification information of the mobile terminal and the acquired identification information of the PC terminal.

In the process of implementing the present disclosure, the inventors have discovered the following problems:

The conventional method for binding terminals requires a series of complex operations to generate a two-dimensional code and to scan the two-dimensional code for two terminals to be bound, and is quite time-consuming. Thus the conventional method to binding terminals has a low efficiency.

SUMMARY

To overcome the existing problems, the present disclosure provides a method and apparatus for binding terminals.

In one aspect, the present disclosure provides a method for binding terminals. The method includes: a server receives first information uploaded by a first terminal. The first information includes at least one of first geographical location information, first time information, and first address information of the first terminal. The server receives second information uploaded by a second terminal. The second information includes at least one of second geographical location information, second time information, and second address information of the second terminal. The server binds the first terminal and the second terminal according to the first information and the second information.

In another aspect, the present disclosure provides a method for binding terminals. The method includes: acquire first information of the first terminal. The first information includes at least one of first geographical location information, first time information, and first address information of the first terminal. The first terminal transmit the first information to a server so that the server binds the first terminal and the second terminal according to the first information and the second information uploaded by the second terminal. The second information includes at least one of second geographical location information, second time information, and second address information of the second terminal. The first terminal and the second terminal displays at least a portion of a pre-configured image when transmitting data between the first and second terminals.

In another aspect, the present disclosure provides an apparatus for binding terminals. The apparatus includes a processor and a non-transitory storage medium. The non-transitory storage medium is configured to store: a first reception module configured to receive first information uploaded by a first terminal, the first information including at least one of first geographical location information, first time information and first address information of the first terminal; a second reception module configured to receive second information uploaded by a second terminal, the second information including at least one of second geographical location information, second time information and second address information of the second terminal; a binding module configured to bind the first terminal and the second terminal according to the first information and the second information.

In another aspect, the present disclosure provides an apparatus for binding terminals. The apparatus includes a processor and a non-transitory storage medium. The processor is configured to: acquire first information of the first terminal. The first information includes at least one of first geographical location information, first time information and first address information of the first terminal. The processor is further configured to transmit the first information to a server, causing the server to bind the first terminal and the second terminal according to the first information and the second information uploaded by the second terminal. The second information includes at least one of second geographical location information, second time information and second address information of the second terminal.

The advantages brought along by the present disclosure are as follows: the method binds the first terminal and the second terminal through at least one of the geographical location information, time information and address information uploaded by the first terminal and the second terminal, thus improving binding efficiency and saving binding time.

BRIEF DESCRIPTION OF THE DRAWINGS

To better explain the schemes of the present disclosure, the accompanying drawings necessary for the illustration of example embodiments of the disclosure are briefly described below, and it is apparent to those of ordinary skill in the art that the accompanying drawings only illustrate some embodiments of the disclosure and that other drawings may be obtained according to the accompanying drawings without any innovative efforts.

DETAILED DESCRIPTION OF THE DRAWINGS

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

For a better understanding of the aim, schemes and advantages of the present disclosure, example embodiments thereof are described in detail in connection with the accompanying drawings as follows.

Figure 1:
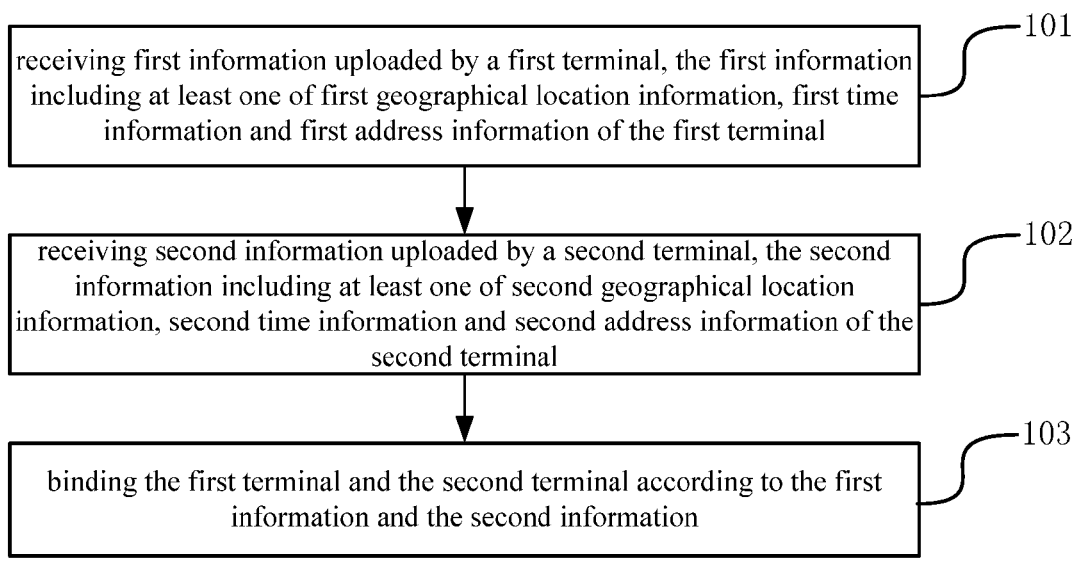
FIG. 1 is a process flow diagram of a method for binding terminals provided by an example embodiment of the present disclosure.

This embodiment of the disclosure provides a method for binding terminals. Referring to FIG. 1, the method includes:

Step 101: a server receive first information uploaded by a first terminal, the first information including at least one of first geographical location information, first time information and first address information of the first terminal. A server, as used herein, may refer to one or more server computers configured to provide certain server functionalities, such as database management and search engines. A server may also include one or more processors to execute computer programs in parallel. The first terminal may be a mobile terminal device installed with a processing system, e.g. the first terminal device may be a mobile phone, a tablet computer, a personal digital assistant (PDA), or any device having a processor.

Step 102: The server receives second information uploaded by a second terminal, the second information including at least one of second geographical location information, second time information and second address information of the second terminal. The second terminal may be a mobile terminal device installed with a processing system, e.g. the first terminal device may be a mobile phone, a tablet computer, a personal digital assistant (PDA), or any device having a processor.

Step 103: The server binds the first terminal and the second terminal according to the first information and the second information.

The method provided by this embodiment of the disclosure binds the first terminal and the second terminal through at least one of the geographical location information, time information, and address information uploaded by the first terminal and the second terminal, thus improving binding efficiency and saving binding time.

Figure 2:
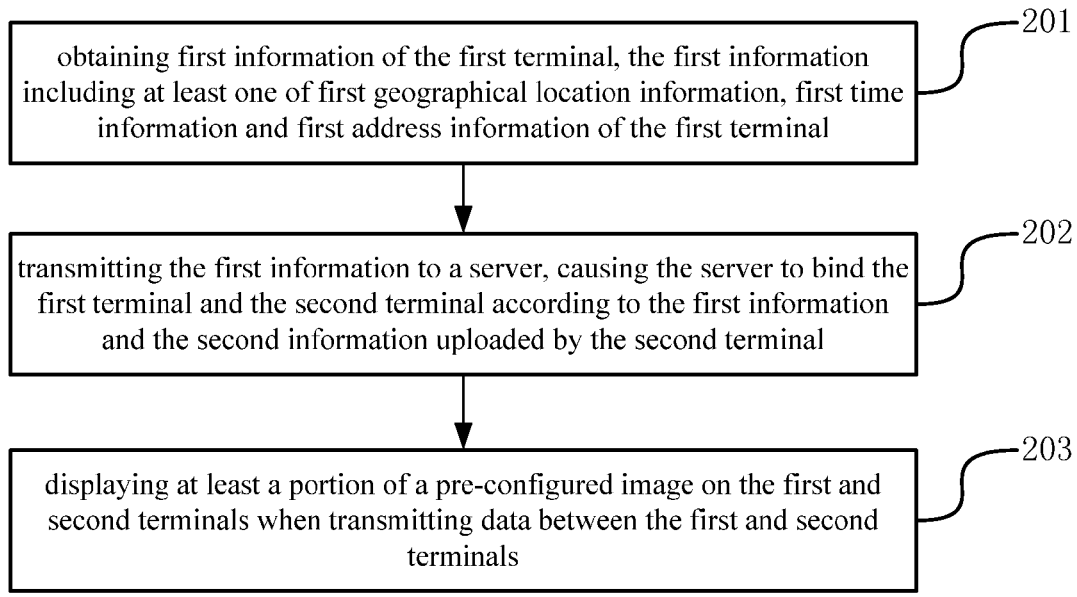
FIG. 2 is a process flow diagram of a method for binding terminals provided by example embodiment of the present disclosure.

This embodiment of the disclosure provides a method for binding terminals. Referring to FIG. 2, the method includes:

Step 201: The first terminal obtains first information of the first terminal, the first information including at least one of first geographical location information, first time information, and first address information of the first terminal.

Step 202: The first terminal transmits the first information to a server, causing the server to bind the first terminal and the second terminal according to the first information and the second information uploaded by the second terminal, wherein the second information includes at least one of second geographical location information, second time information and second address information of the second terminal.

Step 203: The first terminal and the second terminal displays at least a portion of a pre-configured image when transmitting data between the first and second terminals. For example, the first terminal may display a first portion of the pre-configured image while the second terminal may display the remaining portion of the pre-configured image during transmitting. When the transmitting is progressing, the second terminal may display the whole pre-configured image. The first terminal may display the pre-configured image in a first size according to the display dimensions of the first terminal. The first terminal may display the pre-configured image in a second size according to the display dimensions of the second terminal. The pre-configured image may be selected based on the data being transmitted. For example, the pre-configured image may be the first photo when the data includes multiple photos.

The method provided by this embodiment of the disclosure binds the first terminal and the second terminal through at least one of the geographical location information, time information, and address information uploaded by the first terminal and the second terminal, thus improving binding efficiency and saving binding time.

Figure 3:
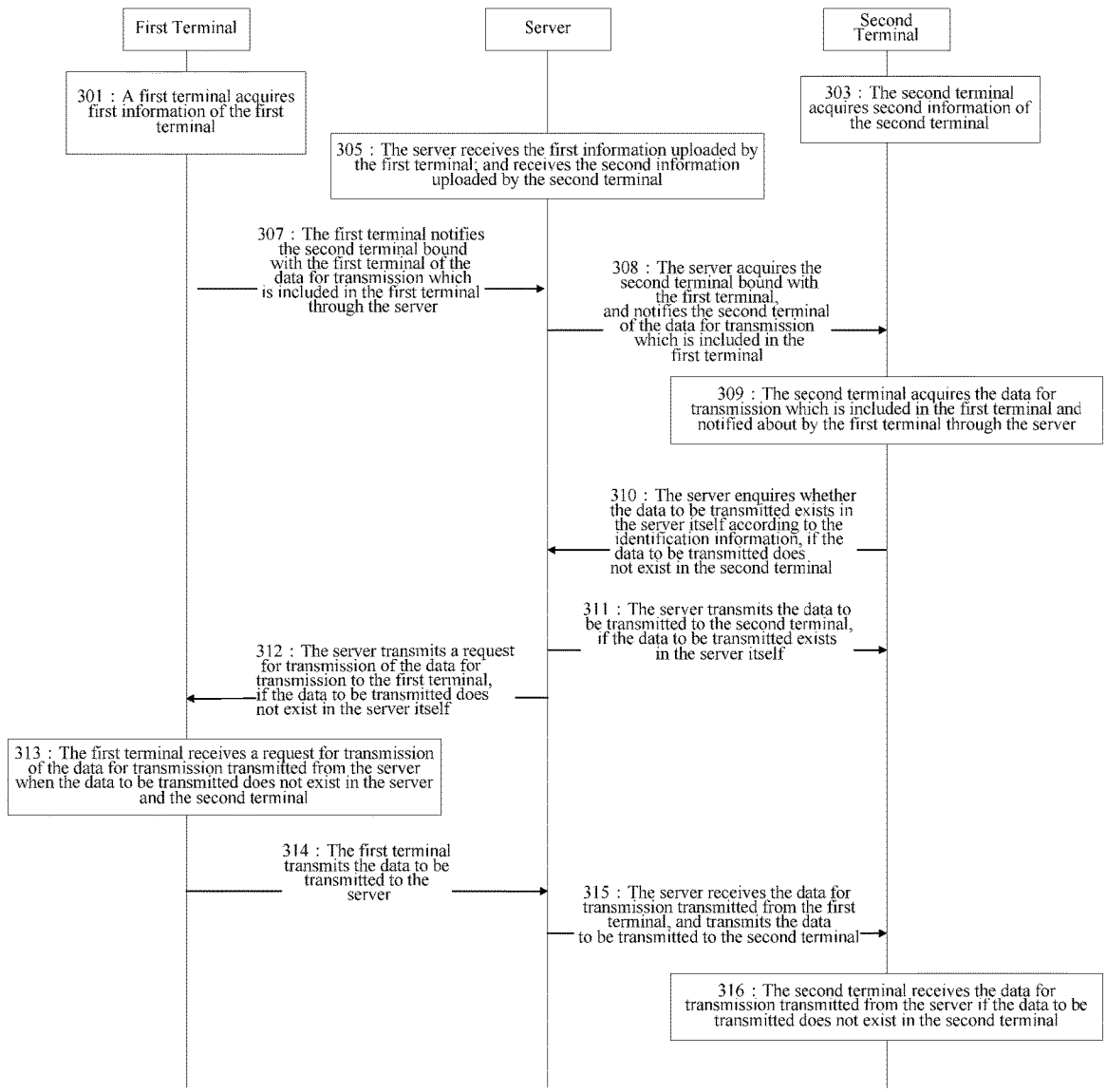
FIG. 3 is a process flow diagram of a method for binding terminals provided by example embodiment of the present disclosure.

This embodiment of the disclosure provides a method for binding terminals as shown in FIG. 3.

Figure 4:
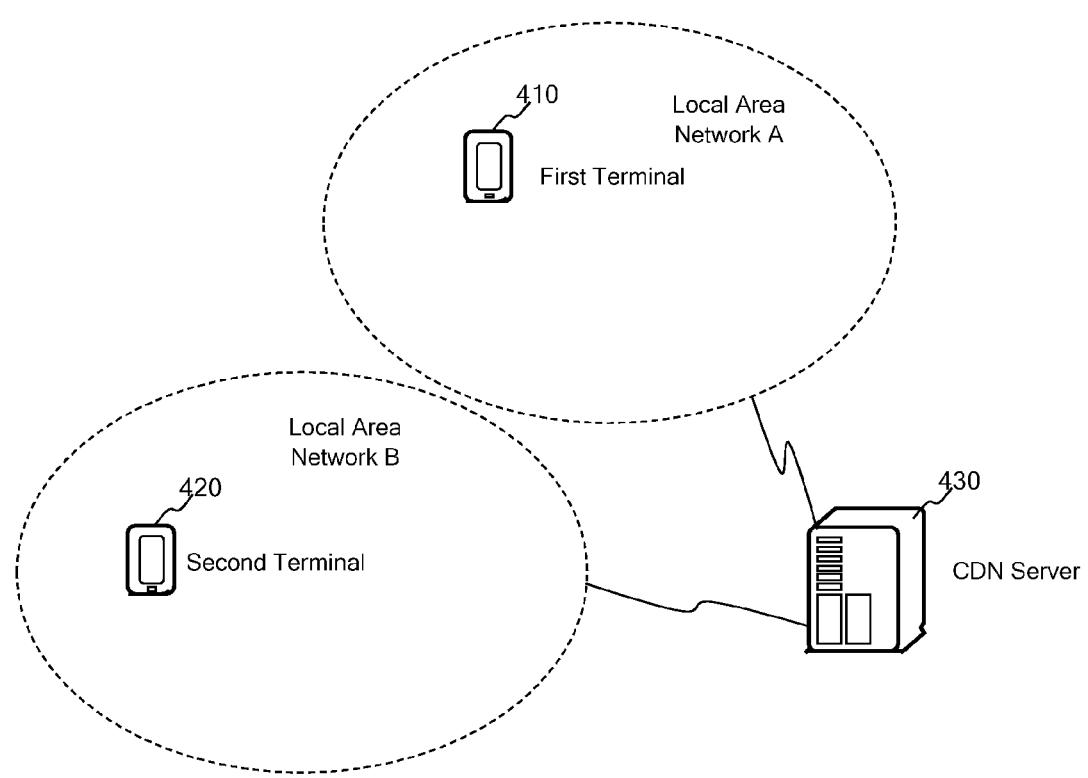
FIG. 4 is a schematic diagram illustrating the implementation of the methods for binding terminals provided by example embodiments of the present disclosure.

The method for binding terminals in this embodiment is described in connection with an environment shown in FIG. 4. In this embodiment of the disclosure, the first terminal 410 and the second terminal 420 may respectively be a mobile phone and a tablet computer and operated through touch screen, and the server 430 may be a content delivery network (CDN) server. The embodiment avoids bottlenecks which may affect data transmission speed and stability, so as to achieve faster and more stable content transmission.

The method for binding terminals includes:

Step 301: a first terminal acquires first information of the first terminal, the first information including at least one of first geographical location information, first time information and first address information of the first terminal.

When a user turns on an application configured for data transmission through the first terminal, the first terminal would initiate the function of its own positioning module to acquire the first geographical location information. Wherein the acquisition of the first geographical location information may be accomplished in the following manners: a GPS module acquires the current latitude and longitude information, a base station acquires position parameters through base station positioning, etc.

Wherein, first time information is also acquired and the first time information is taken as a constraint condition at the time of binding terminals.

For example, a current Internet Protocol address (IP address) of the first terminal is also acquired as a further constraint condition at the time of binding terminals.

Step 302: the first terminal transmits the first information to a server, causing the server to bind the first terminal and the second terminal according to the first information and the second information uploaded by the second terminal, wherein the second information includes at least one of second geographical location information, second time information and second address information of the second terminal.

Step 303: the second terminal acquires second information of the second terminal, the second information including at least one of second geographical location information, second time information and second address information of the second terminal.

Step 304: the second terminal transmits the second information to the server, causing the server to bind the first terminal and the second terminal according to the second information and the first information uploaded by the first terminal, wherein the first information includes at least one of first geographical location information, first time information and first address information of the first terminal.

Step 305: the server receives the first information uploaded by the first terminal, the first information including at least one of first geographical location information, first time information and first address information of the first terminal; receives the second information uploaded by the second terminal, the second information including at least one of second geographical location information, second time information and second address information of the second terminal.

Step 306: the server binds the first terminal and the second terminal according to the first information and the second information.

Wherein, the step of binding the first terminal and the second terminal is as follows:

Bind the first terminal and the second terminal when at least one of the following conditions are met: the distance between the geographical location information of the first terminal and the geographical location information of the second terminal is smaller than a pre-set distance; the time interval between the first time information and the second time information is smaller than a pre-set time; and the first address information and the second time information belongs to the same Internet Protocol address field.

Here, a binding relationship between the first terminal and the second terminal may be established by multiple constraint conditions acquired through multi-dimensional composite matching of geographical location, time and address so as to achieve more accurate correlation, more accurate and more rapid binding, and more convenient data transmission between the first terminal and the second terminal.

Wherein, for restrictions of IP addresses of the terminals to be bound, the terminals may be set to be in the same IP segment. For example, the default field in the IP addresses may be set as 192.168.1.XXX, wherein the "XXX" may be any numeral in the range of 0-255. Therefore, as long as the IP addresses of the two terminals are within in the range of 192.168.1.0 to 192.168.1.255, it is determined that the two terminals are bound.

Further, binding success notifications are transmitted separately to the first terminal and the second terminal which have a binding relationship to notify the user of the first terminal that data may be transmitted or to notify the user of the second terminal to get ready to receive data transmitted from the first terminal.

Step 307: the first terminal notifies the second terminal bound with the first terminal of the data for transmission which is included in the first terminal through the server.

Wherein, after receiving the binding success notification from the server, the first terminal receives a command for the data for transmission selected by the user, and uploads the selected data to the server.

As the server may have already stored the data the user needs to transfer, and repeated transmission of data which already exists in the server would result in wastage of network bandwidth. Preferably, prior to transmitting data to the server, ID of the data is transmitted to the server for comparison and if the data exists in the server, it is not necessary to transmit it again. While the method for computing data ID is not defined, it could be the MD5 message-digest algorithm for example.

Therefore Step 307 may include:

Sub-step 3071: acquire the data for transmission which is included in the first terminal and the identification information of the data to be transmitted;

Sub-step 3072: transmit the identification information to the server, causing the server to determine whether the data to be transmitted exists in the server or the second terminal according to the identification information.

Further, receive the user's data transmission command and transmit the command to the server notifying the server to begin transmitting the data to the second terminal.

Step 308: the server acquires the second terminal bound with the first terminal, and notifies the second terminal of the data for transmission which is included in the first terminal.

For example, the server may directly receive the data transmitted from the first terminal.

Preferably, the identification information of the data transmitted from the first terminal is received, and whether the data exists in the second terminal or the server is determined according to the identification information. If the data exists in the second terminal or the serve, it is not necessary to transmit the data to the second terminal through the server, or it is not necessary to transmit the data to the server through the first terminal. Therefore, Step 408 may include:

Sub-step 3081: receive identification information of the data for transmission transmitted from the first terminal;

Sub-step 3082: transmit the identification information to the second terminal, causing the second terminal to enquire whether the data to be transmitted exists in the second terminal according to the identification information, and notify the second terminal of the data to be transmitted if the data to be transmitted exists in the second terminal.

Further, after receiving the data transmitted from the first terminal, the server re-computes the data ID and compares it with the data ID uploaded by the first terminal, checks whether the data is integral and undamaged after uploading. If the comparison indicates any inconsistency, the first terminal is prompted to retransmit.

Step 309: the second terminal acquires the data for transmission which is included in the first terminal and notified about by the first terminal through the server.

For example, the second terminal may directly receive the data transmitted from the server. Preferably, the second terminal receives identification information of the data for transmission transmitted from the server and enquires whether the data to be transmitted exists in the second terminal itself according to the identification information, and if the data to be transmitted is already stored in the second terminal, it is not necessary to receive the data through the server. Therefore, Step 309 may include:

Sub-step 3091: receive the identification information of the data for transmission transmitted by the first terminal and forwarded from the server;

Sub-step 3092: enquire whether the data to be transmitted exists in the second terminal according to the identification information;

Sub-step 3093: acquire the data for transmission which is included in the first terminal, if the data to be transmitted exists in the second terminal.

Step 310: the server enquires whether the data to be transmitted exists in the server itself according to the identification information, if the data to be transmitted does not exist in the second terminal.

At this time, the second terminal transmits a request for transmission of the data for transmission to the server.

Step 311: the server transmits the data to be transmitted to the second terminal, if the data to be transmitted exists in the server itself.

Step 312: the server transmits a request for transmission of the data for transmission to the first terminal, if the data to be transmitted does not exist in the server itself.

Step 313: the first terminal receives a request for transmission of the data for transmission transmitted from the server when the data to be transmitted does not exist in the server and the second terminal.

Step 314: the first terminal transmits the data to be transmitted to the server.

Step 315: the server receives the data for transmission transmitted from the first terminal, and transmits the data to be transmitted to the second terminal.

Step 316: the second terminal receives the data for transmission transmitted from the server if the data to be transmitted does not exist in the second terminal, the data for transmission having been found by the server in the server itself by enquiry according to the identification information or received by the server from the second terminal.

Wherein, when the second terminal transmits data to the first terminal, the processes may be as follows:

(1) the first terminal acquires the first information of the first terminal, the first information including at least one of first geographical location information, first time information and first address information of the first terminal.

(2) the first terminal transmits the first information to the server, causing the server to bind the first terminal and the second terminal according to the first information and the second information uploaded by the second terminal, wherein the second information includes at least one of second geographical location information, second time information and second address information of the second terminal.

(3) the second terminal acquires the second information of the second terminal, the second information including at least one of second geographical location information, second time information and second address information of the second terminal.

(4) the second terminal transmits the second information to the server, causing the server to bind the first terminal and the second terminal according to the second information and the first information uploaded by the first terminal, wherein the first information includes at least one of first geographical location information, first time information and first address information of the first terminal.

(5) the server receives the first information uploaded by the first terminal, the first information including at least one of first geographical location information, first time information and first address information of the first terminal; the server receives the second information from the second terminal, the second information including at least one of second geographical location information, second time information and second address information of the second terminal.

(6) the server binds the first terminal and the second terminal according to the first information and the second information.

(7) the second terminal notifies the first terminal bound with the second terminal of the data for transmission which is included in the second terminal through the server.

Step (7) may include:

acquire the data for transmission which is included in the second terminal and the identification information of the data to be transmitted;

transmit the identification information to the server, causing the server to determine whether the data to be transmitted exists in the server or the first terminal according to the identification information.

(8) the server acquires the first terminal bound with the second terminal, and notifies the first terminal of the data for transmission which is included in the second terminal.

Step (8) may include:

receive the identification information of the data for transmission transmitted from the second terminal;

transmit the identification information to the first terminal, causing the first terminal to enquire whether the data to be transmitted exists in the first terminal according to the identification information, and if the data to be transmitted exists in the first terminal, notify the first terminal of the data to be transmitted.

(9) the first terminal acquires the data for transmission which is included in the second terminal and notified about by the second terminal through the server.

Step (9) may include:

receive the identification information of the data for transmission transmitted by the second terminal and forwarded from the server;

enquire whether the data to be transmitted exists in the first terminal according to the identification information;

determine the acquisition of the data for transmission which is included in the second terminal if the data to be transmitted exists in the first terminal.

(10) the server enquires whether the data to be transmitted exists in the server itself according to the identification information, if the data to be transmitted does not exist in the first terminal.

(11) the server transmits the data to be transmitted to the first terminal, if the data to be transmitted exists in the server itself.

(12) the server transmits a request for transmission of the data to be transmitted to the second terminal, if the data to be transmitted does not exist in the server itself.

(13) the second terminal receives from the server the request for transmission of the data to be transmitted, when the data to be transmitted does not exist in the server and the first terminal.

(14) the second terminal transmits the data to be transmitted to the server.

(15) the server receives the data for transmission transmitted from the second terminal and transmits the data for transmission to the first terminal.

(16) the first terminal receives the data for transmission transmitted from the server if the data to be transmitted does not exist in the first terminal, the data for transmission having been found by the server in the server itself according to the identification information or received by the server from the second terminal.

The method provided by this embodiment of the disclosure binds the first terminal and the second terminal through at least one of the geographical location information, time information and address information uploaded by the first terminal and the second terminal, thus improving binding efficiency and saving binding time. Further, the binding relationship is temporary and a terminal may at any time re-establish its binding relationship with another terminal and bind with any terminal with which it needs to be bound through at least one of their geographical location information, time information and address information and transmit data between them after binding.

When transmitting data, the user touches an image on the first terminal to control the command for the transmission of the data to be transmitted, and the user may also simulate the transmission effect of the image from the screen of the first terminal to the second terminal by touching the image on the first terminal. The method for request transmission in this embodiment is primarily described in connection with an environment shown in FIG. 4.

Figure 5:
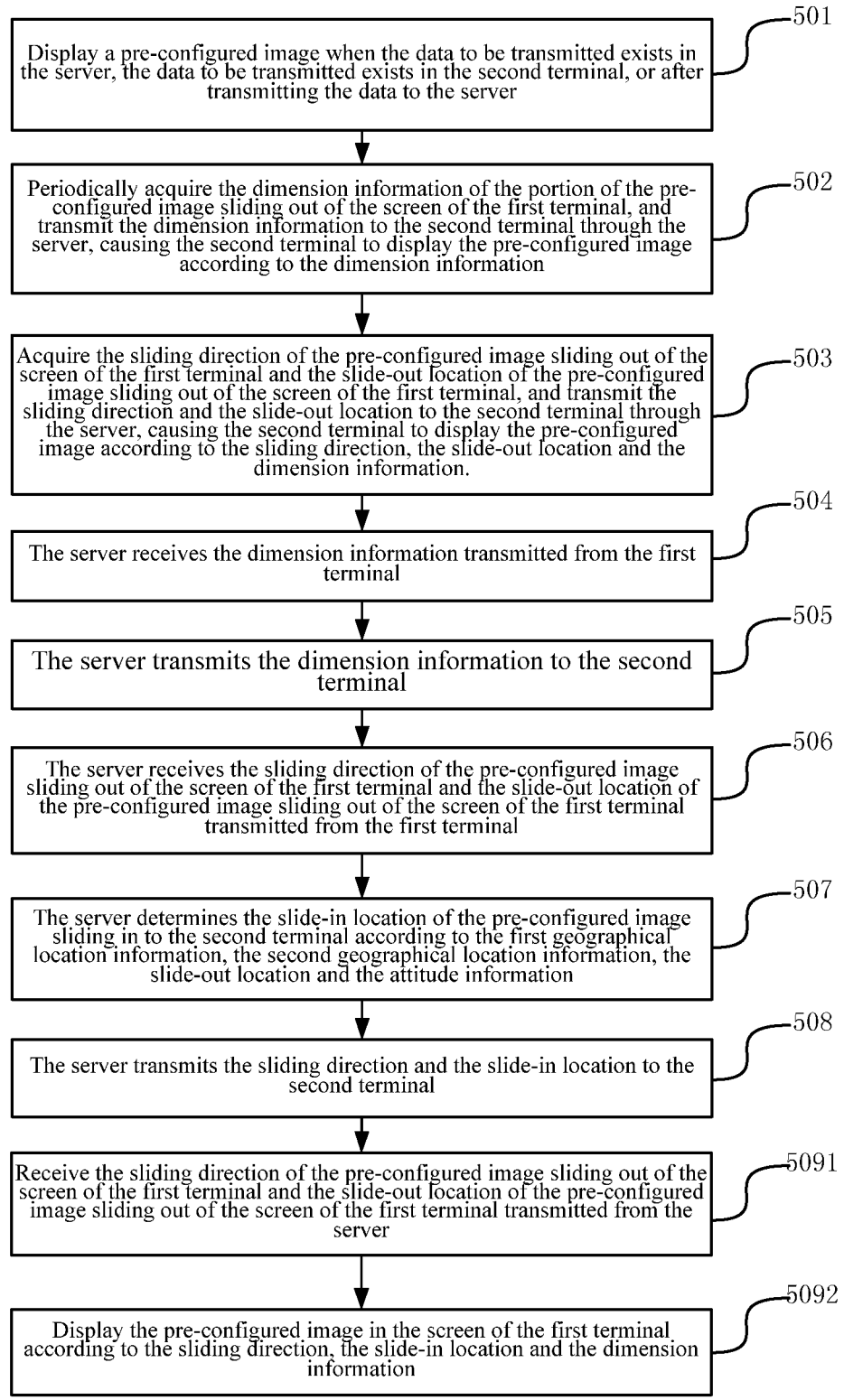
FIG. 5 is a process flow diagram of a method for binding terminals provided by example embodiment of the present disclosure.

Referring to FIG. 5, the method for displaying image during the process of transmitting the data to be transmitted includes:

Step 501: display the pre-configured image to cause the user to simulate the process of notifying about the data to be transmitted by sliding the pre-configured image, when the data to be transmitted exists in the server, the data to be transmitted exists in the second terminal, or after transmitting the data to the server.

By sliding the pre-configured image by means of the touch screen, the user transmits a command to the server for transmission of data, and the server transmits the data to the second terminal according to the command. If the data exists in the second terminal at this time, then only animation effect of the pre-configured image is demonstrated on the second terminal to prompt the second terminal to transmit the data to the server through the first terminal.

Step 502: periodically acquire the dimension information of the portion of the pre-configured image sliding out of the screen of the first terminal, and transmit the dimension information to the second terminal through the server, causing the second terminal to display the pre-configured image according to the dimension information.

For example, the user may discretionarily slide the pre-configured image by means of the touch screen. At this time, periodically acquire the dimension information of the portion of the pre-configured image sliding out of the screen of the first terminal and the server forwards the dimension information to the second terminal, causing the second terminal to display from the edge of the display area of the screen the corresponding effect of the pre-configured image entering the second terminal according to the dimension information.

Wherein, the dimension information may be the area of the portion of the pre-configured image sliding out of the screen, the side length of the portion of the pre-configured image sliding out of the screen, or the ratio of the area of the portion of the pre-configured image sliding out of the screen to the area of the entire pre-configured image, and the content of the dimension information is not defined herein.

Step 503: acquire the sliding direction of the pre-configured image sliding out of the screen of the first terminal and the slide-out location of the pre-configured image sliding out of the screen of the first terminal, and transmit the sliding direction and the slide-out location to the second terminal through the server, causing the second terminal to display the pre-configured image according to the sliding direction, the slide-out location and the dimension information.

Preferably, the sliding direction and the slide-out location are taken as display parameters for the display of the slide-in effect by the second terminal.

Step 504: the server receives the dimension information transmitted from the first terminal, wherein the dimension information is the dimension information of the portion of a pre-configured image sliding out of the screen of the first terminal, the first terminal simulating the process of notifying about the data to be transmitted by sliding the pre-configured image.

Step 505: the server transmits the dimension information to the second terminal, causing the second terminal to display the pre-configured image according to the dimension information.

Wherein, the second information uploaded by the second terminal may also include attitude information of the second terminal, wherein the attitude information is the angle of inclination of the second terminal with respect to the horizontal plane.

Step 506: the server receives the sliding direction of the pre-configured image sliding out of the screen of the first terminal and the slide-out location of the pre-configured image sliding out of the screen of the first terminal transmitted from the first terminal.

Step 507: the server determines the slide-in location of the pre-configured image sliding in to the second terminal according to the first geographical location information, the second geographical location information, the slide-out location and the attitude information.

Wherein, the relative orientation between the first terminal and the second terminal may be determined from the first geographical location information and the second geographical location information. For example, the first terminal is located on the left or right of the second terminal or the first terminal is located at the front or back of the second terminal.

Wherein, the attitude information may determine the angle of inclination of the second terminal with respect to the horizontal plane, i.e. the attitude information may be based to determine whether the terminal is in standing attitude or cross standing attitude, and different attitudes correspond to different slide-in directions of the pre-configured image.

Further, the attitude information may determine the edge of the screen of the second terminal from which the pre-configured image slides in thereto.

For example, when the pre-configured image in the touch screen slides out of the first terminal from the right thereof, the second terminal is in standing attitude and the second terminal is located on the right of the first terminal at this time, then it can be determined that the pre-configured image slides in from the left of the second terminal; when the pre-configured image in the touch screen slides out of the first terminal from the top right corner, the second terminal is in cross standing attitude and the second terminal is located on the right of the first terminal, then it can be determined that the pre-configured image slides in from the bottom left corner of the second terminal.

Step 508: the server transmits the sliding direction and the slide-in location to the second terminal, causing the second terminal to display the pre-configured image according to the sliding direction, the slide-in location and the dimension information.

Step 509: the second terminal receives the dimension information transmitted from the server, wherein the dimension information is the dimension information of the portion of a pre-configured image sliding out of the screen of the first terminal, the first terminal simulating the process of notifying about the data to be transmitted by sliding the pre-configured image; and displays the pre-configured image in the screen thereof according to the dimension information.

Further, other parameters for simulating the process of notifying about the data to be transmitted may also be received to further optimize the display effect. Therefore, Step 509 may include:

Sub-step 5091: receive the sliding direction of the pre-configured image sliding out of the screen of the first terminal and the slide-out location of the pre-configured image sliding out of the screen of the first terminal transmitted from the server;

Sub-step 5092: display the pre-configured image in the screen of the first terminal according to at least one of: the sliding direction, the slide-in location, and the dimension information.

Figure 6:
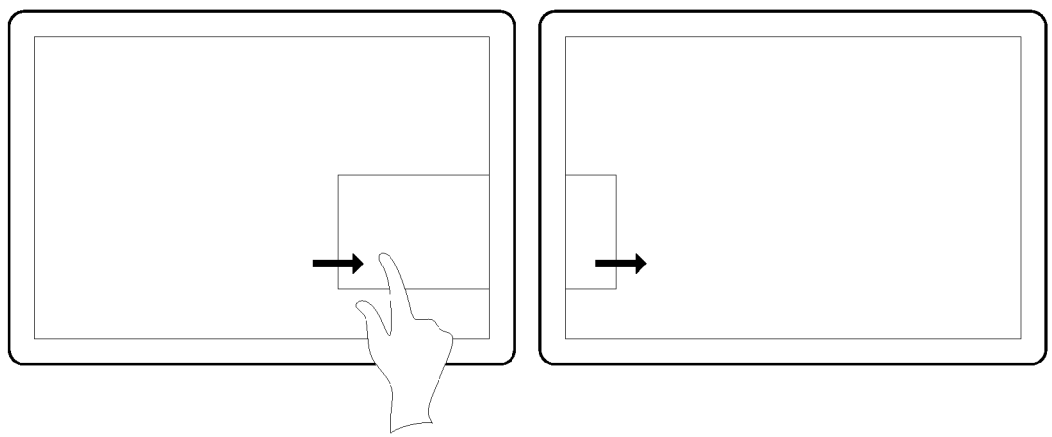
FIG. 6 is a diagram showing the sliding effect provided by example embodiment of the present disclosure.
Figure 7:
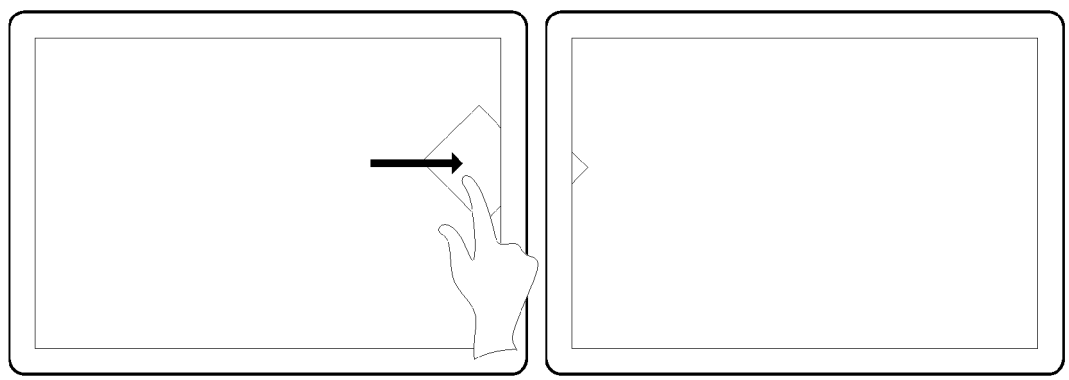
FIG. 7 is another diagram showing the sliding effect provided by example embodiment of the present disclosure.
Figure 8:
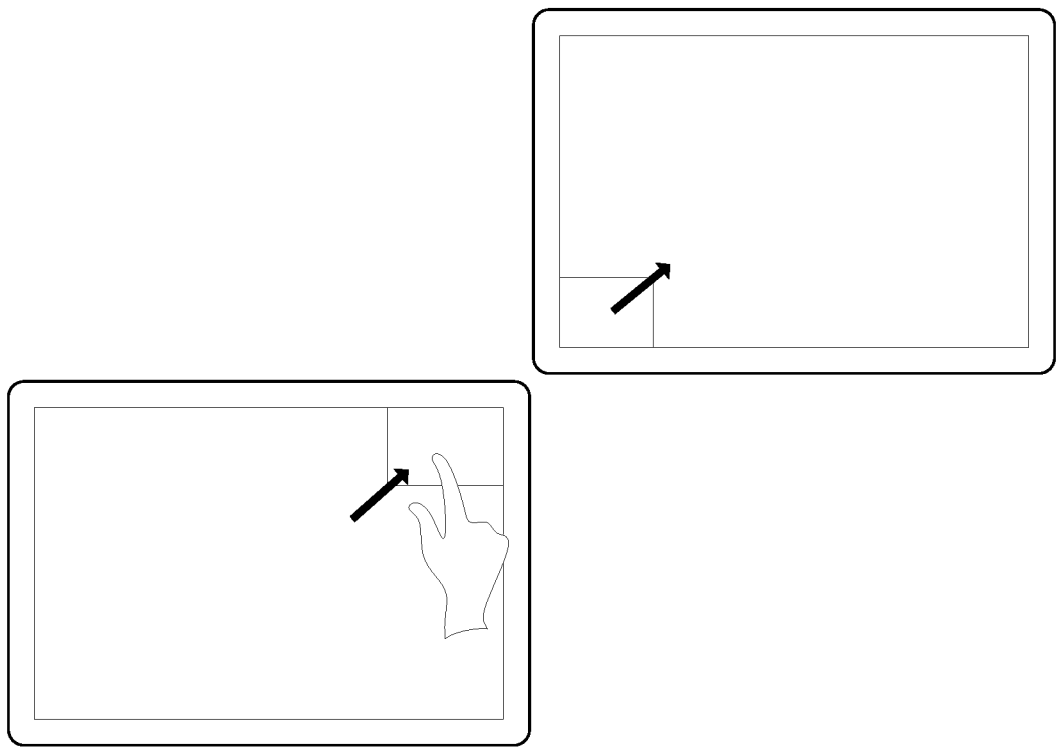
FIG. 8 is another diagram showing the sliding effect provided by example embodiment 4 of the present disclosure.

FIG. 6 shows an example embodiment where the pre-configured image may slide laterally out of the screen of the first terminal from the right side thereof and slide laterally in to the screen of the second terminal from the left side thereof. As shown in FIG. 7, the pre-configured image may slide laterally out of the screen of the first terminal from the right side thereof in another attitude and slide laterally in to the screen of the second terminal from the left side thereof in the same attitude. As shown in FIG. 8, the pre-configured image may slide out of the screen of the first terminal from the top right corner thereof slide in to the screen of the second terminal from the bottom left corner thereof.

Further, when the second terminal transmits data to the first terminal, the processes of displaying the pre-configured image may be as follows:

(1) display the pre-configured image to cause the user to simulate the process of notifying about the data to be transmitted by sliding the pre-configured image, when the data to be transmitted exists in the server, the data to be transmitted exists in the first terminal, or after transmitting the data to the server.

(2) periodically acquire the dimension information of the portion of the pre-configured image sliding out of the screen of the second terminal, and transmit the dimension information to the first terminal through the server, causing the first terminal to display the pre-configured image according to the dimension information.

(3) acquire the sliding direction of the pre-configured image sliding out of the screen of the second terminal and the slide-out location of the pre-configured image sliding out of the screen of the second terminal, and transmit the sliding direction and the slide-out location to the first terminal through the server, causing the first terminal to display the pre-configured image according to the sliding direction, the slide-out location and the dimension information.

(4) the server receives the dimension information transmitted from the second terminal, wherein the dimension information is the dimension information of the portion of a pre-configured image sliding out of the screen of the second terminal, the second terminal simulating the process of notifying about the data to be transmitted by sliding the pre-configured image.

(5) the server transmits the dimension information to the first terminal, causing the first terminal to display the pre-configured image according to the dimension information.

Wherein, the first information uploaded by the first terminal may also include attitude information of the first terminal, wherein the attitude information is the angle of inclination of the first terminal with respect to the horizontal plane.

(6) the server receives the sliding direction of the pre-configured image sliding out of the screen of the second terminal and the slide-out location of the pre-configured image sliding out of the screen of the second terminal transmitted from the second terminal.

(7) the server determines the slide-in location of the pre-configured image sliding in to the first terminal according to the second geographical location information, the first geographical location information, the slide-out location and the attitude information.

(8) the server transmits the sliding direction and the slide-in location to the first terminal, causing the first terminal to display the pre-configured image according to the sliding direction, the slide-in location and the dimension information.

(9) the first terminal receives the dimension information transmitted from the server, wherein the dimension information is the dimension information of the portion of a pre-configured image sliding out of the screen of the second terminal, the second terminal simulating the process of notifying about the data to be transmitted by sliding the pre-configured image; and displays the pre-configured image in the screen thereof according to the dimension information.

Step (9) may include:

receive the sliding direction of the pre-configured image sliding out of the screen of the second terminal and the slide-out location of the pre-configured image sliding out of the screen of the second terminal transmitted from the server;

display the pre-configured image in the screen of the first terminal according to the sliding direction, the slide-in location and the dimension information.

The method provided by this embodiment of the disclosure binds the first terminal and the second terminal through at least one of the geographical location information, time information and address information uploaded by the first terminal and the second terminal, thus improving binding efficiency and saving binding time. Further, the transmission process is simulated by pre-configured animation after the binding of the first terminal and the second terminal to prompt the user of the bound receiver terminal to carry out data transmission.

Figure 9:
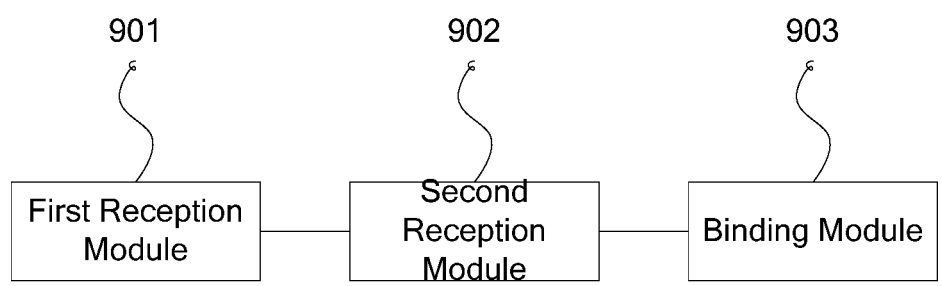
FIG. 9 is a schematic block diagram of an apparatus for binding terminals provided by example embodiment of the present disclosure.

This embodiment of the disclosure provides an apparatus for binding terminals. Referring to FIG. 9, the apparatus includes:

a first reception module 901 configured to receive first information uploaded by a first terminal, the first information including at least one of first geographical location information, first time information and first address information of the first terminal;

a second reception module 902 configured to receive second information uploaded by a second terminal, the second information including at least one of second geographical location information, second time information and second address information of the second terminal;

a binding module 903 configured to bind the first terminal and the second terminal according to the first information and the second information.

The method provided by this embodiment of the disclosure binds the first terminal and the second terminal through at least one of the geographical location information, time information and address information uploaded by the first terminal and the second terminal, thus improving binding efficiency and saving binding time. Further, the binding relationship is temporary and a terminal may at any time re-establish its binding relationship with another terminal and bind with any terminal with which it needs to be bound through at least one of their geographical location information, time information and address information and transmit data between them after binding.

Embodiment 6

Figure 10:
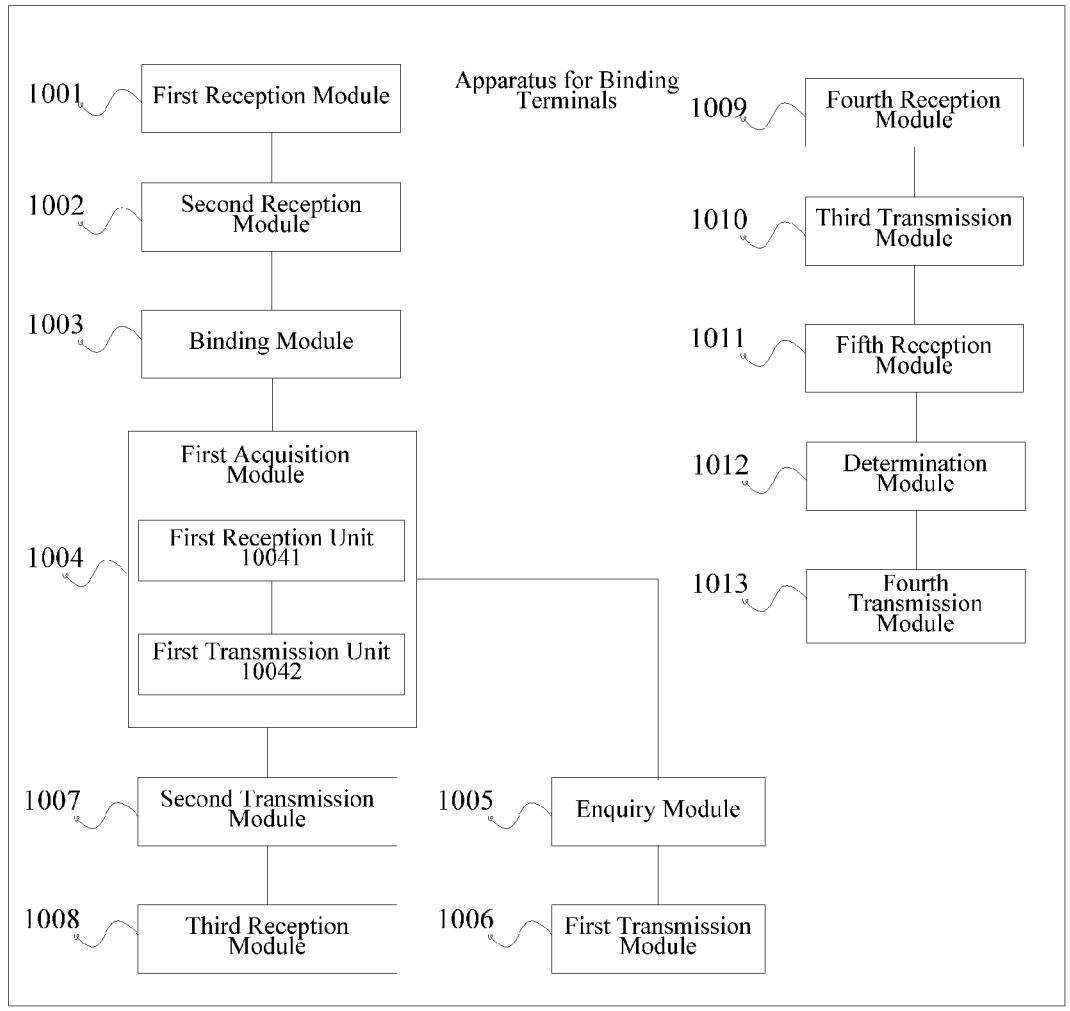
FIG. 10 is a schematic block diagram of an apparatus for binding terminals provided by example embodiment of the present disclosure.

This embodiment of the disclosure provides an apparatus for binding terminals. Referring to FIG. 10, the apparatus includes:

a first reception module 1001 configured to receive first information uploaded by a first terminal, the first information including at least one of first geographical location information, first time information and first address information of the first terminal;

a second reception module 1002 configured to receive second information uploaded by a second terminal, the second information including at least one of second geographical location information, second time information and second address information of the second terminal;

a binding module 1003 configured to bind the first terminal and the second terminal according to the first information and the second information.

Wherein, the binding module 1003 is configured to:

bind the first terminal and the second terminal when the distance between the geographical location information of the first terminal and the geographical location information of the second terminal is smaller than a pre-set distance, the time interval between the first time information and the second time information is smaller than a pre-set time and/or the first address information and the second time information belongs to the same Internet Protocol address field.

Wherein, the apparatus further includes:

a first acquisition module 1004 configured to acquire the second terminal bound with the first terminal and to notify the second terminal of the data for transmission which is included in the first terminal.

Wherein, the first acquisition module 1004 includes:

a first reception unit 10041 configured to receive identification information of the data for transmission transmitted from the first terminal;

a first transmission unit 10042 configured to transmit the identification information to the second terminal, causing the second terminal to enquire whether the data to be transmitted exists in the second terminal according to the identification information, and notify the second terminal of the data to be transmitted if the data to be transmitted exists in the second terminal.

Wherein, the apparatus further includes:

an enquiry module 1005 configured to enquire whether the data to be transmitted exists in the server itself according to the identification information, if the data to be transmitted does not exist in the second terminal;

a first transmission module 1006 configured to transmit the data to be transmitted to the second terminal, if the data to be transmitted exists in the server itself.

Wherein, the apparatus further includes:

a second transmission module 1007 configured to transmit a request for transmission of the data to be transmitted to the first terminal if the data to be transmitted does not exist in the server itself;

a third reception module 1008 configured to receive the data for transmission transmitted from the first terminal and to transmit the data for transmission to the second terminal.

Wherein, the apparatus further includes:

a fourth reception module 1009 configured to receive dimension information transmitted from the first terminal, wherein the dimension information is the dimension information of the portion of a pre-configured image sliding out of the screen of the first terminal, the first terminal simulating the process of notifying about the data to be transmitted by sliding the pre-configured image;

a third transmission module 1010 configured to transmit the dimension information to the second terminal, causing the second terminal to display the pre-configured image according to the dimension information.

Wherein, the second information also includes attitude information, the attitude information being the angle of inclination of the second terminal with respect to the horizontal plane.

Wherein, the apparatus further includes:

a fifth reception module 1011 configured to receive the sliding direction of the pre-configured image sliding out of the screen of the first terminal and the slide-out location of the pre-configured image sliding out of the screen of the first terminal transmitted from the first terminal;

a determination module 1012 configured to determine the slide-in location of the pre-configured image sliding in to the second terminal according to the first geographical location information, the second geographical location information, the slide-out location and the attitude information;

a fourth transmission module 1013 configured to transmit the sliding direction and the slide-in location to the second terminal, causing the second terminal to display the pre-configured image according to the sliding direction, the slide-in location and the dimension information.

The method provided by this embodiment of the disclosure binds the first terminal and the second terminal through at least one of the geographical location information, time information and address information uploaded by the first terminal and the second terminal, thus improving binding efficiency and saving binding time. Further, the binding relationship is temporary and a terminal may at any time re-establish its binding relationship with another terminal and bind with any terminal with which it needs to be bound through at least one of their geographical location information, time information and address information and transmit data between them after binding.

Figure 11:
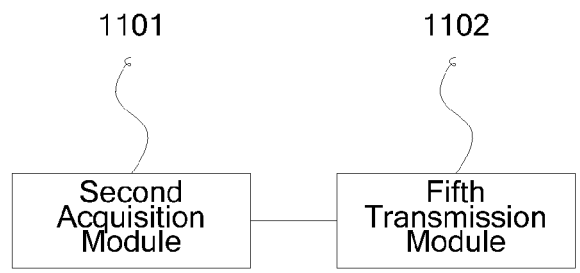
FIG. 11 is a schematic block diagram of an apparatus for binding terminals provided by example embodiment of the present disclosure.

This embodiment of the disclosure provides an apparatus for binding terminals. Referring to FIG. 11, the apparatus includes:

a second acquisition module 1101 configured to acquire first information of the first terminal, the first information including at least one of first geographical location information, first time information and first address information of the first terminal;

a fifth transmission module 1102 configured to transmit the first information to a server, causing the server to bind the first terminal and the second terminal according to the first information and the second information uploaded by the second terminal, wherein the second information includes at least one of second geographical location information, second time information and second address information of the second terminal.

The method provided by this embodiment of the disclosure binds the first terminal and the second terminal through at least one of the geographical location information, time information and address information uploaded by the first terminal and the second terminal, thus improving binding efficiency and saving binding time. Further, the binding relationship is temporary and a terminal may at any time re-establish its binding relationship with another terminal and bind with any terminal with which it needs to be bound through at least one of their geographical location information, time information and address information and transmit data between them after binding.

Figure 12:
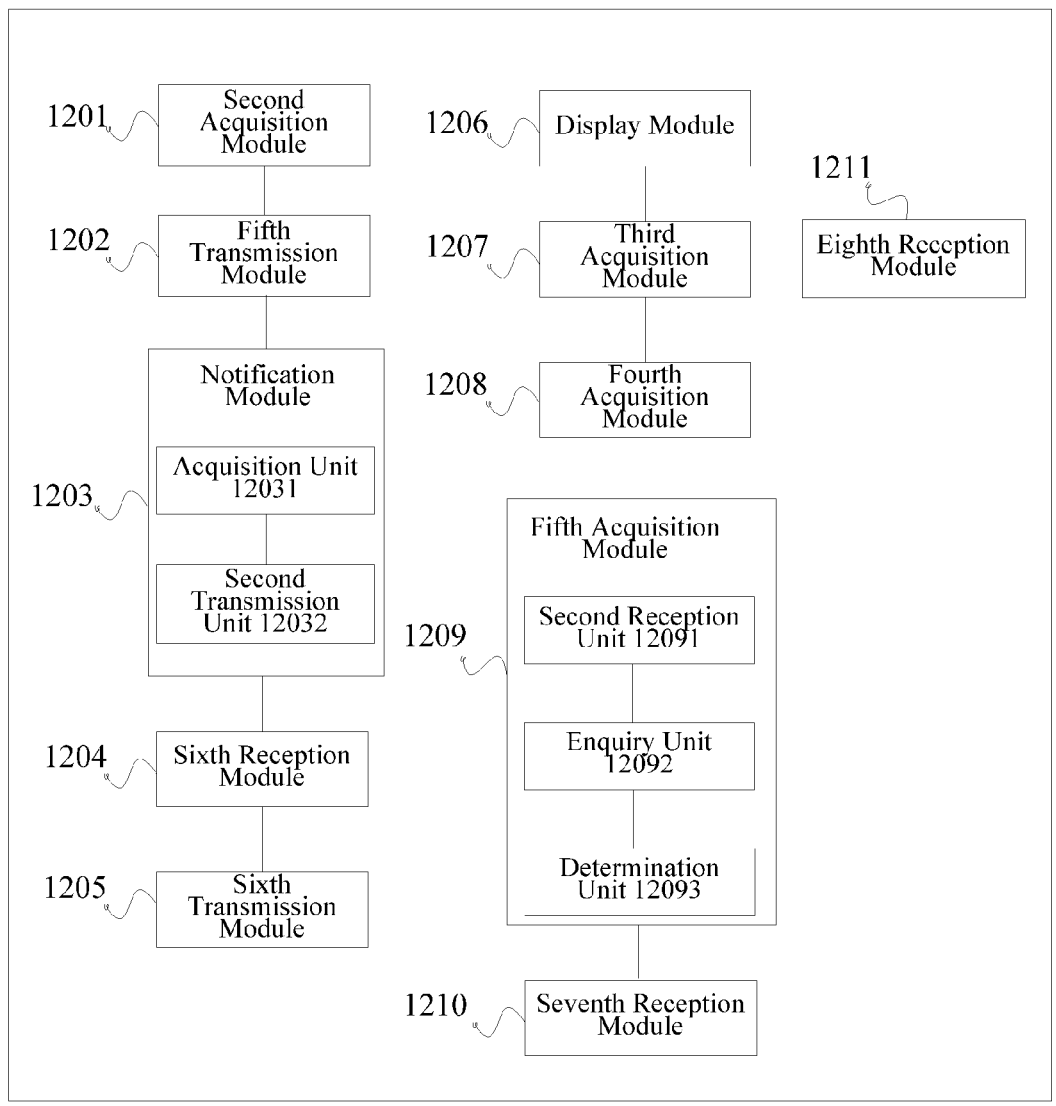
FIG. 12 is a schematic block diagram of an apparatus for binding terminals provided by example embodiment of the present disclosure.

This embodiment of the disclosure provides an apparatus for binding terminals. Referring to FIG. 12, the apparatus includes:

a second acquisition module 1201 configured to acquire first information of the first terminal, the first information including at least one of first geographical location information, first time information and first address information of the first terminal;

a fifth transmission module 1202 configured to transmit the first information to a server, causing the server to bind the first terminal and the second terminal according to the first information and the second information uploaded by the second terminal, wherein the second information includes at least one of second geographical location information, second time information and second address information of the second terminal.

Wherein, the apparatus further includes:

a notification module 1203 configured to notify the second terminal bound with the first terminal of the data for transmission which is included in the first terminal through the server.

Wherein, the notification module 1203 includes:

an acquisition unit 12031 configured to acquire the data for transmission which is included in the first terminal and the identification information of the data to be transmitted;

a transmission unit 12032 configured to transmit the identification information to the server, causing the server to determine whether the data to be transmitted exists in the server or the second terminal according to the identification information.

Wherein, the apparatus further includes:

a sixth reception module 1204 configured to receive a request for transmission of the data for transmission transmitted from the server when the data to be transmitted does not exist in the server and the second terminal;

a sixth transmission module 1205 configured to transmit the data to be transmitted to the server.

Wherein, the apparatus further includes:

a display module 1206 configured to display the pre-configured image to cause the user to simulate the process of notifying about the data to be transmitted by sliding the pre-configured image, when the data to be transmitted exists in the server, the data to be transmitted exists in the second terminal, or after transmitting the data to the server;

a third acquisition module 1207 configured to periodically acquire the dimension information of the portion of the pre-configured image sliding out of the screen of the first terminal, and transmit the dimension information to the second terminal through the server, causing the second terminal to display the pre-configured image according to the dimension information.

Wherein, the apparatus further includes:

a fourth acquisition module 1208 configured to acquire the sliding direction of the pre-configured image sliding out of the screen of the first terminal and the slide-out location of the pre-configured image sliding out of the screen of the first terminal, and transmit the sliding direction and the slide-out location to the second terminal through the server, causing the second terminal to display the pre-configured image according to the sliding direction, the slide-out location and the dimension information.

Wherein, the apparatus further includes:

a fifth acquisition module 1209 configured to acquire the data for transmission which is included in the second terminal and notified about by the second terminal through the server.

Wherein, the fifth acquisition module 1209 includes:

a second reception unit 12091 configured to receive the identification information of the data for transmission transmitted by the second terminal and forwarded from the server;

an enquiry unit 12092 configured to enquire whether the data to be transmitted exists in the first terminal according to the identification information;

a determination unit 12093 configured to determine the acquisition of the data for transmission which is included in the second terminal if the data to be transmitted exists in the first terminal.

Wherein, the apparatus further includes:

a seventh reception module 1210 configured to receive the data for transmission transmitted from the server if the data to be transmitted does not exist in the first terminal, the data for transmission having been found by the server in the server itself according to the identification information or received by the server from the second terminal.

Wherein, the apparatus further includes:

an eighth reception module 1211 configured to receive dimension information transmitted from the server, wherein the dimension information is the dimension information of the portion of a pre-configured image sliding out of the screen of the second terminal, the second terminal simulating the process of notifying about the data to be transmitted by sliding the pre-configured image and displays the pre-configured image in the screen thereof according to the dimension information.

Wherein, the eighth reception module 1211 includes:

a third reception unit 12111 configured to receive the sliding direction of the pre-configured image sliding out of the screen of the first terminal and the slide-out location of the pre-configured image sliding out of the screen of the first terminal transmitted from the server;

a display unit 12112 configured to display the pre-configured image in the screen of the first terminal according to the sliding direction, the slide-in location and the dimension information.

The method provided by this embodiment of the disclosure binds the first terminal and the second terminal through at least one of the geographical location information, time information and address information uploaded by the first terminal and the second terminal, thus improving binding efficiency and saving binding time. Further, the binding relationship is temporary and a terminal may at any time re-establish its binding relationship with another terminal and bind with any terminal with which it needs to be bound through at least one of their geographical location information, time information and address information and transmit data between them after binding.

The arrangement of the foregoing embodiments is merely intended to facilitate illustration of the present disclosure and does not signify the quality of the embodiments.

It should be understood by those with ordinary skill in the art that all or some of the acts of the foregoing embodiments may be completed by hardware, and may also be completed by hardware instructed by program. The program may be stored in a computer-readable storage medium. The computer readable storage medium may include at least one of the following: a read-only memory, a magnetic disk, and a compact disk.

Disclosed above are only example embodiments of the present disclosure and these example embodiments are not intended to limit the scope of the present disclosure. Thus, any variations, modifications, or replacements made without departing from the spirit of the present disclosure shall fall within the scope of the present disclosure and be covered by the claims below.

What is claim is:

1. A method for binding and transferring data between terminals by a server, comprising:

receiving, by the server, first information uploaded by a first terminal, the first information comprising at least one of first current geographical location information and first address information of the first terminal;

receiving, by the server, second information uploaded by a second terminal, the second information comprising at least one of second current geographical location information and second address information of the second terminal;

binding, by the server, the first terminal and the second terminal according to the first information and the second information uploaded by the first and second terminals; and receiving, by the server and separately from the first information, data identification information of data to be transmitted and stored in the first terminal after binding the first terminal and the second terminal but before receiving the data, wherein the data identification information is computed by the first terminal from the data to be transmitted using a predetermined coding algorithm.

2. The method of claim 1, wherein the predetermined coding algorithm comprises a message-digest algorithm.

3. The method of claim 1, further comprising binding the first terminal and the second terminal when:

a distance between the first terminal and second terminal as determined by the first current geographical location information and the second current geographical location information is smaller than a pre-set distance; and the first address information and the second address information belongs to a same Internet Protocol address field.

4. The method of claim 1, after binding the first terminal and the second terminal when the first information and the second information meets at least one pre-set condition and after receiving the data identification information, further comprising:

identifying the second terminal bound with the first terminal and notifying the second terminal of the data to be transmitted by transmitting the data identification information to the second terminal.

5. The method of claim 4, wherein notifying the second terminal of the data to be transmitted further comprises causing the second terminal to inquire whether the data to be transmitted exists in the second terminal according to the data identification information.

6. The method of claim 5, wherein causing the second terminal to inquire whether the data to be transmitted exists in the second terminal comprises:

receiving by the second terminal the data identification information from the server;

comparing by the second terminal the received data identification information with a plurality of data identifications computed by the second terminal for a plurality of data stored in the second terminal using the predetermined coding algorithm; and determining by the second terminal that the data to be transmitted exists in the second terminal when the received data identification information matches one of the plurality of data identifications computed by the second terminal.

7. The method of claim 4, after binding the first terminal and the second terminal when the first information and the second information meets at least one pre-set condition, further comprising:

simulating, by the first terminal, the notifying the second terminal of the data to be transmitted by sliding a pre-configured image out of a screen of the first terminal;

receiving, by the server, a dimension information transmitted from the first terminal, wherein the dimension information comprises the dimension information indicating a portion of the pre-configured image sliding out of the screen of the first terminal; and transmitting, by the server, the dimension information to the second terminal, causing the second terminal to display the pre-configured image according to the dimension information.

8. A method for binding terminals, comprising:
determining first information of a first terminal, the first information comprising at least one of first current geographical location information and first address information of the first terminal;
transmitting, by the first terminal, the first information to a server so that the server binds the first terminal and a second terminal according to the first information and second information uploaded by the second terminal, wherein the second information comprises at least one of second current geographical location information and second address information of the second terminal; and
displaying, by the first terminal a portion of a pre-configured image with decreasing dimension, and by the second terminal, a complementary portion of the pre-configured image with increasing dimension, when transmitting data to be transmitted and stored in the first terminal between the first and second terminals after binding the first and the second terminals, for simulating a progression of transmitting the data.

9. The method of claim 8, further comprising:
notifying the second terminal bound with the first terminal of the data to be transmitted and that is stored in the first terminal through the server.

10. The method of claim 9, wherein notifying the second terminal bound with the first terminal of the data to be transmitted comprises:
obtaining by the first terminal the data to be transmitted and data identification information of the data to be transmitted; and
transmitting the data identification information to the server, causing the server to determine whether the data to be transmitted exists in the server according to the data identification information.

11. The method of claim 10, wherein the data identification information of the data is computed by the first terminal from the data to be transmitted using a predetermined coding algorithm.

12. The method of claim 11, wherein causing the server to determine whether the data to be transmitted exists in the server comprises:
comparing the data identification information of the data to be transmitted that is received from the first terminal with a plurality of data identifications computed by the server for a plurality of data stored in the server using the predetermined coding algorithm; and
determining that the data to be transmitted exists in the server when the data identification information of the data to be transmitted that is received from the first terminal matches one of the plurality of data identifications computed by the server.

13. The method of claim 9, wherein notifying the second terminal bound with the first terminal of the data stored in the first terminal for transmission through the server comprises:
obtaining by the server the data to be transmitted and stored in the first terminal and data identification information of the data to be transmitted; and
transmitting the data identification information to the server, causing the server to determine whether the data to be transmitted exists in the second terminal according to the data identification information.

14. The method of claim 13, wherein the data identification information of the data is computed by the first terminal from the data to be transmitted using a predetermined coding algorithm.

15. The method of claim 14, wherein causing the server to determine whether the data to be transmitted exists in the second terminal comprises:
transmitting by the server the data identification information to the second terminal; and
causing, by the server, the second terminal to
compare the data identification information of the data to be transmitted with a plurality of data identifications computed by the second terminal for a plurality of data stored in the second terminal using the predetermined coding algorithm; and
determine that the data to be transmitted exists in the second terminal when the data identification information of the data to be transmitted matches one of the plurality of data identifications computed by the second terminal.

16. An apparatus for binding and transferring data between terminals, comprising a processor and a non-transitory storage medium storing instructions, the instructions, when executed by the processor, cause the apparatus to:
receive first information uploaded by a first terminal, the first information comprising at least one of first current geographical location information and first address information of the first terminal;
receive second information uploaded by a second terminal, the second information comprising at least one of second current geographical location information and second address information of the second terminal;
bind the first terminal and the second terminal when a distance between the first terminal and the second terminal as determined by the first current geographical location information and the second current geographical location information is smaller than a pre-set distance or the first address information and the second address information belongs to a same Internet Protocol address field; and
receive separately from the first information, data identification information of data to be transmitted and stored in the first terminal after binding the first terminal and the second terminal but before receiving the data, wherein the data identification information is computed by the first terminal from the data to be transmitted using a predetermined coding algorithm.

17. The apparatus of claim 16, wherein the predetermined coding algorithm comprises a message-digest algorithm.

18. The apparatus of claim 16, wherein the instructions, when executed by the processor, further cause the apparatus to:
notify the second terminal of the data to be transmitted by transmitting the data identification information of the data to be transmitted to the second terminal to cause the second terminal to inquire whether the data to be transmitted exists in the second terminal according to the data identification information;
inquire whether the data to be transmitted exists in the apparatus itself according to the data identification information if the data to be transmitted does not exist in the second terminal; and
transmit the data to be transmitted to the second terminal if the data to be transmitted exists in the apparatus itself but not in the second terminal.

19. The apparatus of claim 18, wherein the second terminal inquires whether the data to be transmitted exists in the second terminal according to the data identification information by:
- comparing the data identification information of the data to be transmitted with a plurality of data identifications computed by the second terminal for a plurality of data stored in the second terminal using the predetermined coding algorithm; and
- determining that the data to be transmitted exists in the second terminal when the data identification information of the data to be transmitted matches one of the plurality of data identifications computed by the second terminal.

20. The apparatus of claim 18, wherein the instructions, when executed by the processor to cause the apparatus to inquire whether the data to be transmitted existed in the apparatus itself according to the data identification information, cause the apparatus to:
- compare the data identification information of the data to be transmitted with a plurality of data identifications computed by the apparatus for a plurality of data stored in the apparatus using the predetermined coding algorithm; and
- determine that the data to be transmitted exists in the apparatus when the data identification information of the data to be transmitted matches one of the plurality of data identifications computed by the apparatus.

* * * * *